(12) United States Patent
Chae et al.

(10) Patent No.: US 11,412,485 B2
(45) Date of Patent: *Aug. 9, 2022

(54) METHOD AND DEVICE FOR SELECTING RESOURCE AND TRANSMITTING PSSCH IN WIRELESS COMMUNICATION SYSTEM

(71) Applicant: LG Electronics Inc., Seoul (KR)

(72) Inventors: Hyukjin Chae, Seoul (KR); Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 66 days.

This patent is subject to a terminal disclaimer.

(21) Appl. No.: 16/938,043

(22) Filed: Jul. 24, 2020

(65) Prior Publication Data

US 2021/0014845 A1 Jan. 14, 2021

Related U.S. Application Data

(63) Continuation of application No. 16/336,804, filed as application No. PCT/KR2017/010720 on Sep. 26, 2017, now Pat. No. 10,764,867.

(Continued)

(51) Int. Cl.
*H04W 72/04* (2009.01)
*H04W 72/02* (2009.01)

(52) U.S. Cl.
CPC ....... *H04W 72/0406* (2013.01); *H04W 72/02* (2013.01); *H04W 72/04* (2013.01)

(58) Field of Classification Search
CPC . H04W 72/0406; H04W 72/04; H04W 72/02; H04W 72/0446
See application file for complete search history.

(56) References Cited

U.S. PATENT DOCUMENTS

| | | | |
|---|---|---|---|
| 2015/0327118 A1 | 11/2015 | Yoon | H04W 76/14 370/328 |
| 2016/0219620 A1 | 7/2016 | Lee et al. | |
| 2016/0338079 A1 | 11/2016 | Yeh | H04W 72/10 |

FOREIGN PATENT DOCUMENTS

WO 2015160158 A1 10/2015

OTHER PUBLICATIONS

3GPP TS 36.331 V14.1.0 (Dec. 2016); 3rd Generation Partnership Project; Technical Specification Group Radio Access Network; Evolved Universal Terrestrial Radio Access (E-UTRA); Radio Resource Control (RRC); Protocol specification (Release 14) (Year: 2016).

(Continued)

*Primary Examiner* — Lan-Huong Truong
(74) *Attorney, Agent, or Firm* — Dentons US LLP

(57) ABSTRACT

An embodiment of the present invention provides a method for a first UE to transmit a physical sidelink shared channel (PSSCH) in a wireless communication system, the PSSCH transmission method comprising: a step of excluding subframes, used by a second UE, from candidate subframes for PSSCH transmission; and a step of selecting a subframe for transmitting a PSSCH and transmitting the PSSCH, after excluding the subframes, used by the second UE, from the candidate subframes, wherein the subframes used by the second UE include subframes assumed to be repeatedly used by the second UE according to a reservation period of the second UE, wherein, if the reservation period of the second UE is smaller in value than a predetermined value, the shorter the reservation period of the second UE becomes, the greater the number of the subframes assumed to be repeatedly used becomes.

7 Claims, 11 Drawing Sheets

Related U.S. Application Data

(60) Provisional application No. 62/400,618, filed on Sep. 27, 2016, provisional application No. 62/403,049, filed on Sep. 30, 2016, provisional application No. 62/405,865, filed on Oct. 7, 2016, provisional application No. 62/418,020, filed on Nov. 4, 2016, provisional application No. 62/407,451, filed on Oct. 12, 2016, provisional application No. 62/418,166, filed on Nov. 4, 2016.

(56) References Cited

OTHER PUBLICATIONS

Intel Corporation, "Discussion on sensing aspects to support V2V communication with different transmission periodicity", 3GPP TSG RAN WG1 Meeting #85, May 23-27, 2016, R1-165073.

Huawei, HiSilicon, "Details of sensing timeline design", 3GPP TSG RAN WG1 Meeting #86, Aug. 22-26, 2016, R1-166165.

NTT DoCoMo, Inc., "Further details of UE autonomous resource (re)selection for V2V", 3GPP TSG RAN WG1 Meeting #86, Aug. 22-26, 2016, R1-167355.

NTT DoCoMo, Inc., "Transmitter UE behaviour for sensing-based resource allocation", 3GPP TSG RAN WG1 Meeting #85, May 23-27, 2016, R1-165192, XP051096221.

NTT DoCoMo, Inc., "Discussion on SA decoding and energy measurement for sensing", 3GPP TSG RAN WG1 Meeting #85, May 23-27, 2016, R1-165191, XP051096222.

LG Electronics, Status Report to TSG, "Support for V2V services based on LTE sidelink", 3GPP TSG RAN meeting #73, Sep. 19-22, 2016, RP-161602, XP051661820.

R1-166169: 3GG TSG RAN WG1 Meeting #86, Gothenburg, Sweden, Aug. 22-26, 2016, Huawei, HiSilicon,"Details of sensing procedure and resource (re)selection triggering mechanisms," pp. 1-6.

RP-161824: 3GPP TSG RAN WG1 Meeting #73, New Orleans, Sep. 19-22, 2016, LG Electronics, Huawei, CATT, "Revised WI proposal: LTE-based V2X Services" pp. 1-10.

R1-167077: 3GG TSG RAN WG1 Meeting #86, Gothenburg, Sweden, Aug. 22-26, 2016, Sony, "Discussion on the remaining issues of transmission UE behaviour," pp. 1-5.

R1-166435: 3GG TSG RAN WG1 Meeting #86, Gothenburg, Sweden, Aug. 22-26, 2016, CATT, "Discussion on details of resource reselection and reservation," pp. 1-4.

R1-166512: 3GPP TSG RAN WG1 Meeting #86, Gothenburg, Sweden, Aug. 22-26, 2016, Intel Corporation, "Transmitter behavior for sidelink resource (re)selection," pp. 1-6.

NTT DoCoMo, "Discussion on SA decoding and energy measurement for sensing", 3GPP TSG RAN WG1 Meeting #85, May 23-27, 2016, R1-165191.

NTT DoCoMo, Inc., "Transmitter UE behaviour for sensing-based resource allocation", 3GPP TSG RAN WG1 Meeting #85, May 23-27, 2016, R1-165192.

Samsung, "Timeline of PSCCH/PSSCH transmission and resource reservation", 3GPP TSG RAN WG1 #85, Aug. 22-26, 2016, R1-166715.

LG Electronics Inc., "Support for V2V services based on LTE sidelink", 3GPP TSG-RAN WG2 Meeting #95, Aug. 22-26, 2016, R2-165801.

(a)

(b)

(a)

(b)

METHOD AND DEVICE FOR SELECTING RESOURCE AND TRANSMITTING PSSCH IN WIRELESS COMMUNICATION SYSTEM

This application is a continuation application of U.S. patent application Ser. No. 16/336,804 filed Mar. 26, 2019, which is a National State Entry of International Application No. PCT/KR2017/010720 filed Sep. 26, 2017, and claims priority to U.S. Provisional Application Nos. 62/400,618 filed Sep. 27, 2016; 62/403,049 filed Sep. 30, 2016; 62/405,865 filed Oct. 7, 2016; 62/418,020 filed Nov. 4, 2016; 62/407,451 filed Oct. 12, 2016 and 62/418,166 filed Nov. 4, 2016, all of which are hereby incorporated by reference in their entireties as if fully set forth herein.

TECHNICAL FIELD

The following description relates to a wireless communication system, and more particularly, to a method by which a user equipment selects a resource and transmits a Physical Sidelink Shared Channel (PSSCH) and device therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE OF THE INVENTION

Technical Task

The technical task of the present disclosure is to provide how a UE repeating transmission with a short reservation period selects resources and transmits a Physical Sidelink Shared Channel (PSCCH).

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an embodiment of the present invention, provided is a method of transmitting a Physical Sidelink Shared Channel (PSSCH) by a first User Equipment (UE) in a wireless communication system. The method includes: excluding subframes used by a second UE from among candidate subframes for PSSCH transmission; and after excluding the subframes used by the second UE from among the candidate subframes, transmitting the PSSCH by selecting a subframe for transmitting the PSSCH. The subframes used by the second UE include subframes which are assumed to be repeatedly used by the second UE according to a reservation period of the second UE. When the reservation period of the second UE is smaller than a predetermined value, a number of the subframes assumed to be repeatedly used increases as the reservation period of the second UE decreases.

In another embodiment of the present invention, provided is a first User Equipment (UE) device for transmitting a Physical Sidelink Shared Channel (PSSCH) in a wireless communication system. The first UE device includes: a transmitting module; a receiving module; and a processor. The processor is configured to transmit the PSSCH through the transmitting module by selecting a subframe for transmitting the PSSCH after excluding subframes used by a second UE from among candidate subframes for PSSCH transmission. The subframes used by the second UE include subframes which are assumed to be repeatedly used by the second UE according to a reservation period of the second UE. When the reservation period of the second UE is smaller than a predetermined value, a number of the subframes assumed to be repeatedly used increases as the reservation period of the second UE decreases.

When a reservation period of the first UE is smaller than the predetermined value, the first UE may perform measurement according to the reservation period of the first UE, which is smaller than the predetermined value.

When the reservation period of the second UE is x [ms] which is smaller than the predetermined value, the number of the subframes assumed to be repeatedly used may be a reciprocal of 10x.

A counter value related to a number of times that the first UE can repeat transmission may be selected within a predetermined range.

The predetermined range may be configured differently for each reservation period.

When a reservation period of the first UE is smaller than the predetermined value, the first UE may select the counter value within a range greater than that when the reservation period is equal to the predetermined value.

The predetermined range may be configured such that even if the reservation period varies, a maximum value of an interval where the transmission can be repeated is constant.

The interval where the transmission can be repeated may be determined based on a product of the reservation period and the counter value.

The measurement may correspond to averaging Sidelink Received Signal Strength Indicators (S-RSSIs).

When the reservation period of the second UE is 20 [ms], a number of times of the repeated use may be 5.

The predetermined value may be 100 [ms].

A Physical Sidelink Control Channel (PSCCH) may be transmitted together with the PSSCH in the selected subframe.

A Physical Sidelink Control Channel (PSCCH) of the second UE may be transmitted in the subframes used by the second UE.

Advantageous Effects

According to the present disclosure, target resources can be determined based on a differentiated threshold in resource selection, thereby providing differentiated protection against a signal of another UE.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the present invention and are incorporated in and constitute a part of this application, illustrate embodiments of the present invention and together with the description serve to explain the principle of the disclosure. In the drawings.

BEST MODE FOR INVENTION

Figure 1:
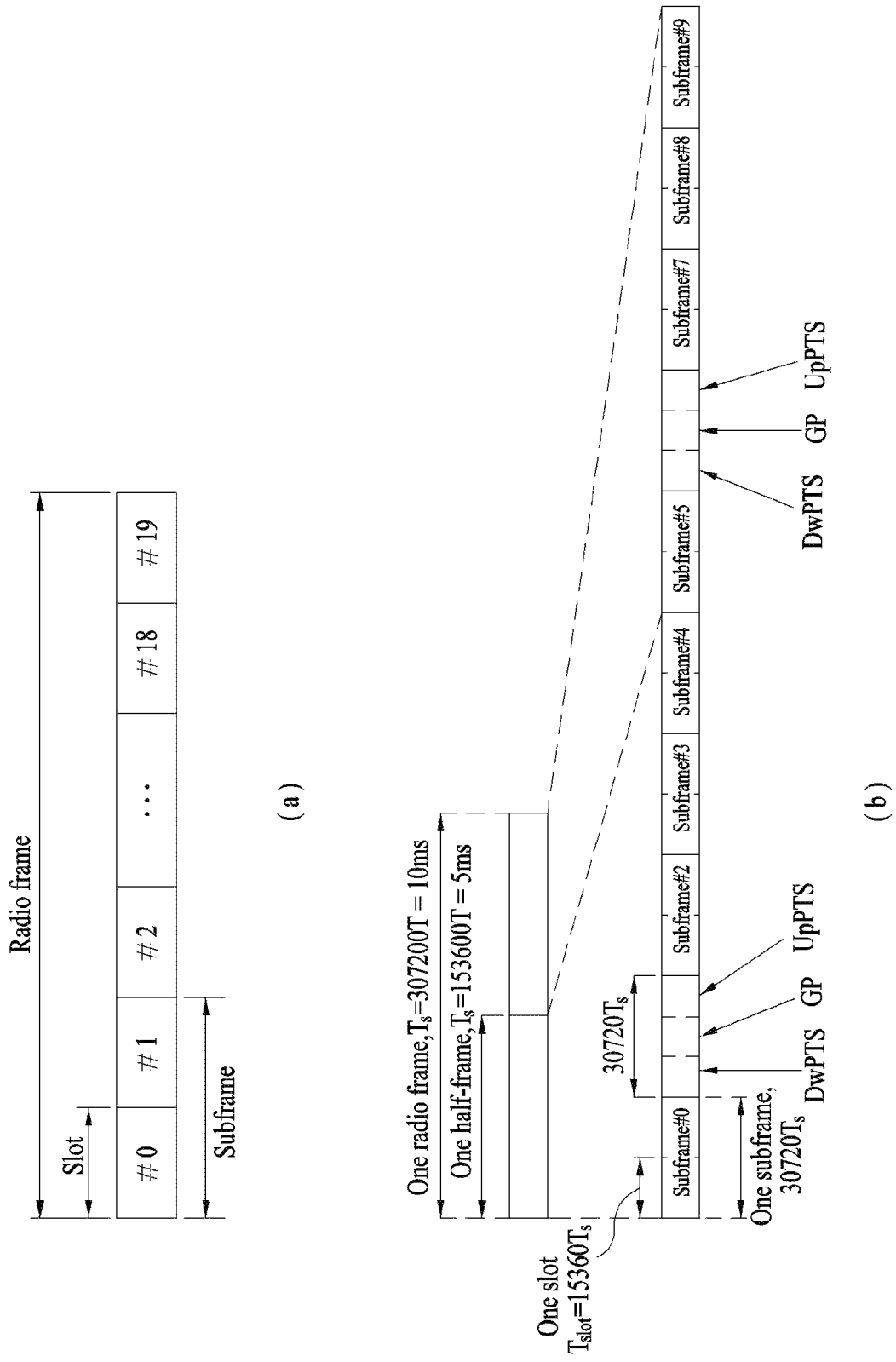
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDMA symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
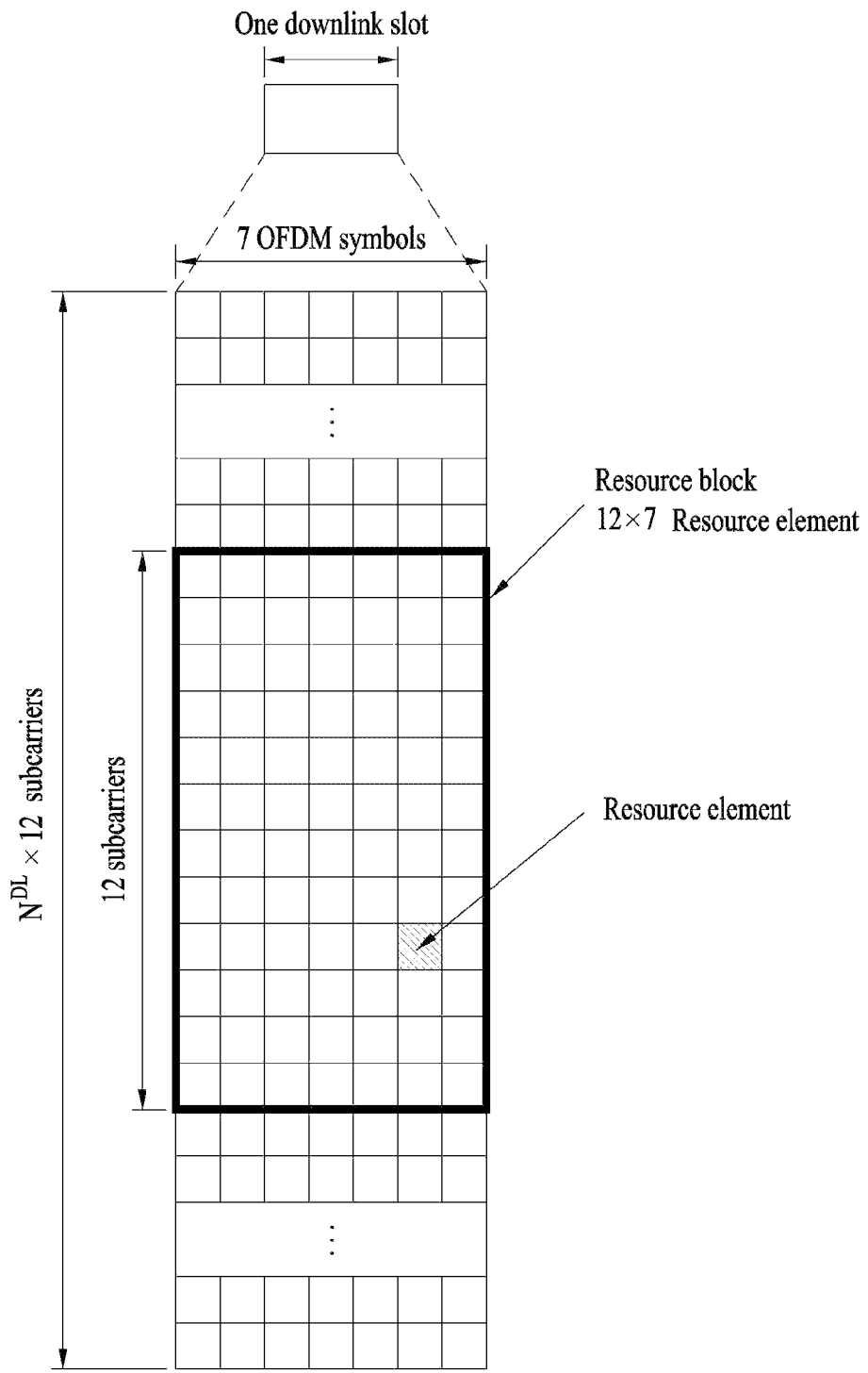
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
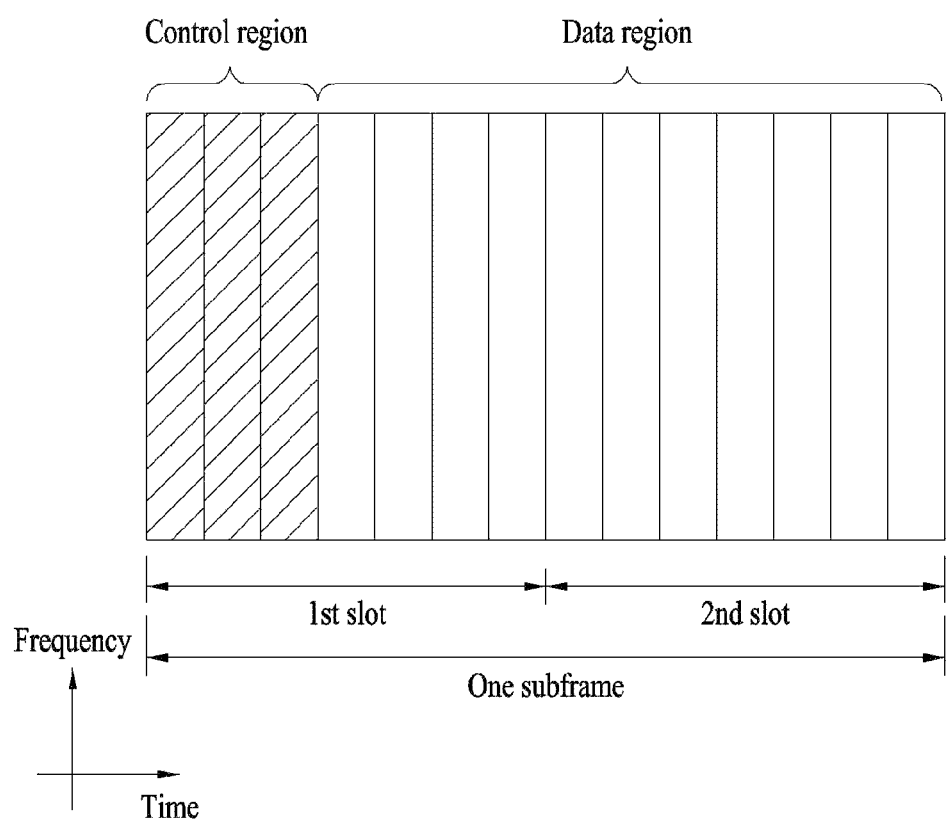
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDMA symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
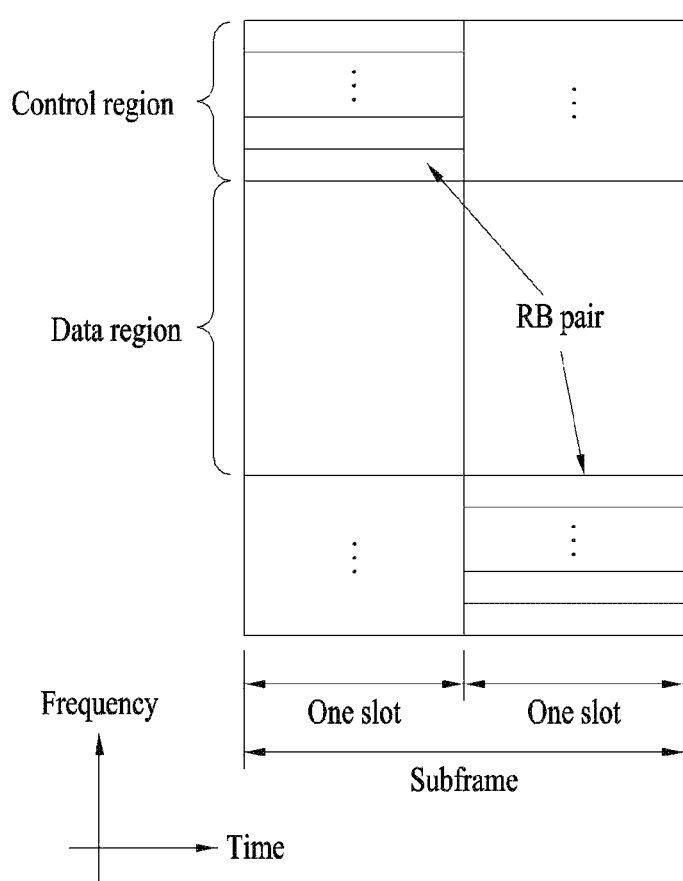
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
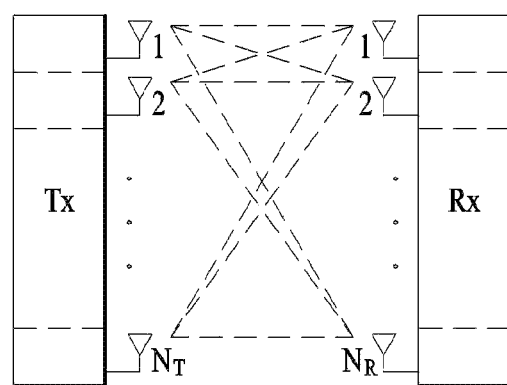
FIG. 5 is a view illustrating the configuration of a wireless communication system having multiple antennas.
Figure 5:
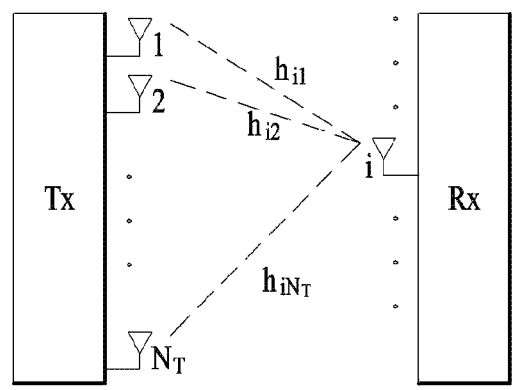

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{s}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix w to the information vector $\hat{s}$ having the adjusted transmit powers, the weight matrix w serves to appropriately distribute the transmission information to each antenna according to a transport channel state. $x_1, x_2, \ldots, x_{N_T}$ can be expressed by using the vector x as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an $i^{th}$ Tx antenna and $j^{th}$ information. W is also called a precoding matrix.

If the $N_R$ $R_x$ antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
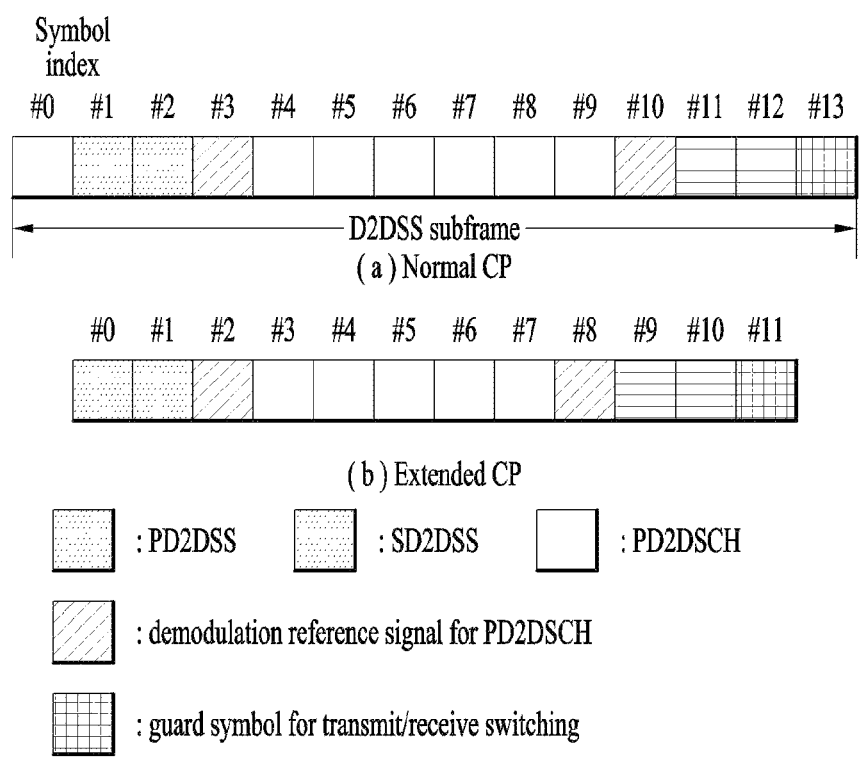
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
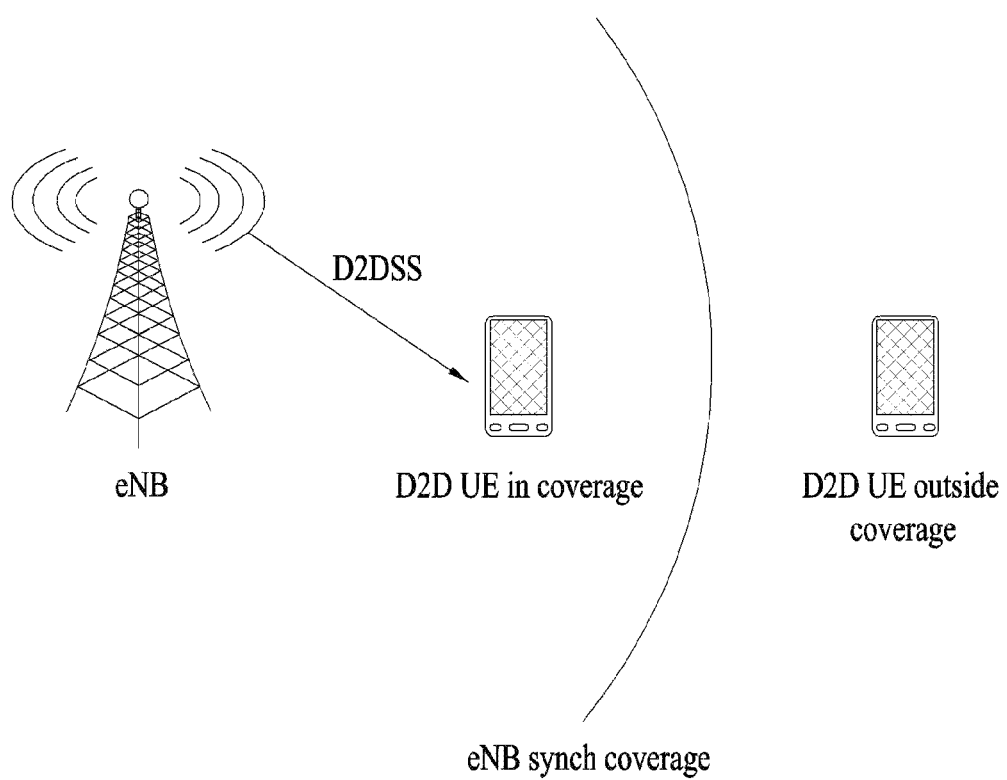
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
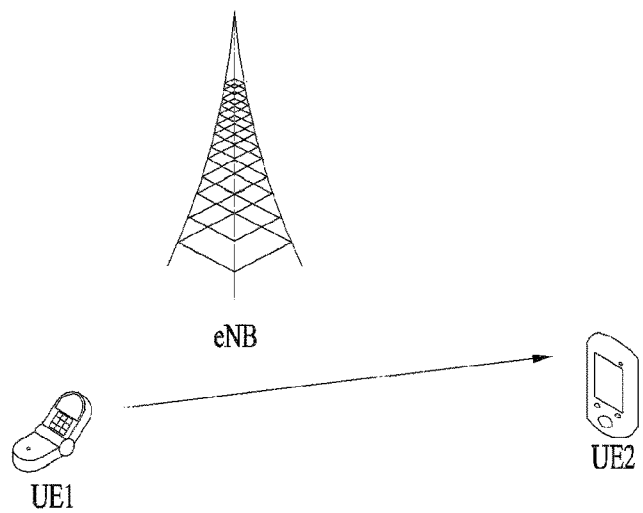
FIG. 8 is a view illustrating an exemplary D2D resource pool for D2D communication.
Figure 8:
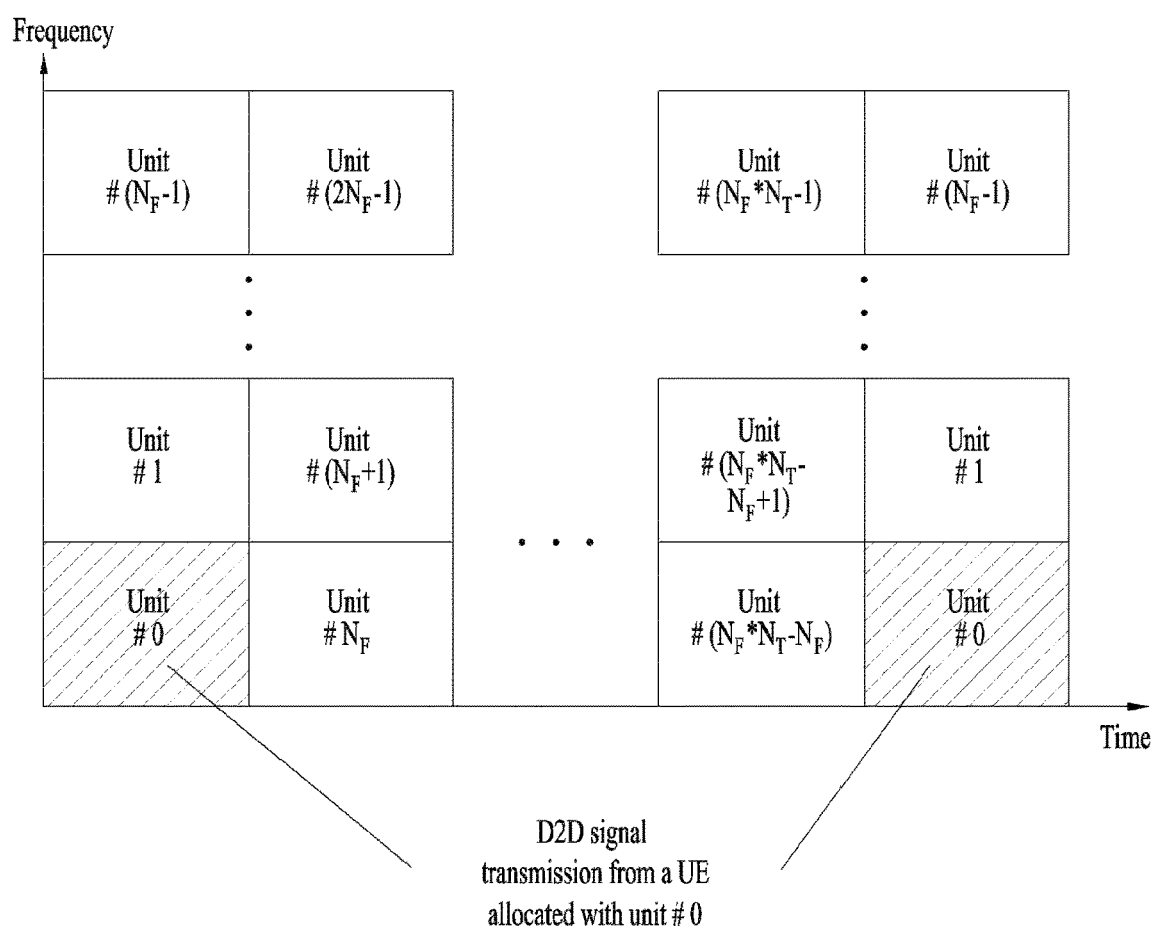

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
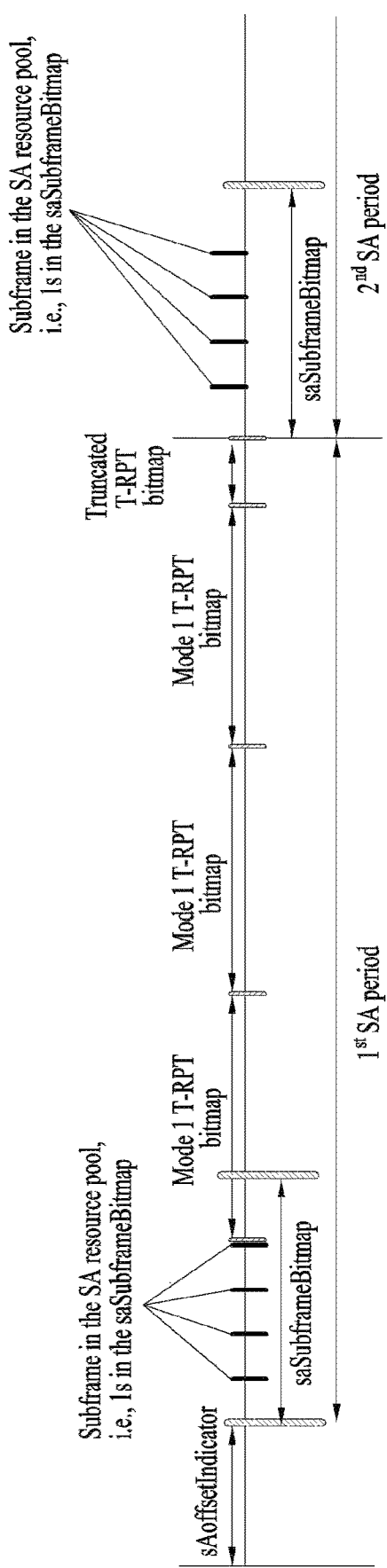
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to is set in a T-RPT bitmap in an indicated T-RPT and transmits one medium access control layer protocol data unit (MAC PDU) four times.

Meanwhile, in V2V communication, a periodic type of Cooperative Awareness Message (CAM) and an event-triggered type of decentralized environmental notification message (DENM) can be used. The CAM may include dynamic state information of a vehicle such as direction and speed, vehicle static data such as dimensions, and basic vehicle information such as ambient illumination states, path details, etc. The CAM may be 50 to 300 bytes long. In addition, the CAM is broadcast, and its latency should be less than 100 ms. The DENM may be generated upon occurrence of an unexpected incident such as a breakdown or an accident of a vehicle. The DENM may be shorter than 3000 bytes and can be received by all vehicles within its transmission range. The DENM may have priority over the CAM. When it is said that messages are prioritized, it may mean that from the perspective of one UE, if there are messages to be transmitted at the same time, a message with the highest priority is preferentially transmitted, or among the plurality of messages, a message with a higher priority is transmitted earlier in time than other messages. From the perspective of a plurality of UEs, it could be interpreted to mean that a high-priority message is designed to be less vulnerable to interference than a low-priority message, thereby reducing a reception error probability. If security overhead is included in the CAM, its message size may be larger than when there is no security overhead.

Embodiments

The following description of the embodiments of the present disclosure is based on not only the aforementioned features but also the following V2V resource selection method. Specifically, the V2V resource selection method can be divided into Step 2, where a UE excludes a specific resource from candidate resources (subframes) based on PSCCH decoding and measurement, and Step 3, where the UE selects a resource to be used for transmission from the remaining resources and performs the transmission after completing Step 2.

In Step 2, a UE may exclude a resource at least based on SA decoding and additional conditions. When an SA and data related thereto are transmitted in the same subframe, following Option 2-1 (measurement on a DMRS of a PSSCH) is supported. According to Option 2-1, a resource is excluded if it is indicated or reserved by a decoded SA and PSSCH-RSRP in related data resource is greater than a threshold. Here, the PSSCH-RSRP is defined as the linear average over power contributions of REs where DMRSs related to a PSSCH are transmitted. The reference point for the PSSCH-RSRP should be an antenna connector of the UE. If the UE uses receiver diversity, a reported value should be lower than corresponding PSSCH-RSRP at each diversity branch. The threshold is a function of (pre)configured priority information, and the SA contains 3-bit PPPP. The threshold has granularity of [2] dB including minus infinity and plus infinity and is in a range between [−128 dBm] and [0 dBm]. The threshold depends on both priority information of a TB and priority information of the decoded SA, and a total of 64 thresholds are (pre)configured.

In Step 2, if the UE decodes an SA at TTI m+c within a sensing period, the UE may assume that the same frequency resource is reserved by a UE transmitting the SA at TTI m+d+P*i. Here, P may be a parameter fixed to 100 in LTE Release 14. The value configured for this parameter may be changed later. In addition, i is selected in the range of [0, 1, . . . , 10], which is restricted by a carrier-specific network configuration. In this case, i=0 means that there is no intention to reserve the frequency resource. In RAN 1, signaling of this restriction may be various. For example, a 10-bit bitmap may be signaled to indicate whether each of [1, . . . , 10] is allowed or not. Selection of i depends on UE implementation. If there is no data to be transmitted, RAN1 assumes that the UE performs no transmission or no resource reservation. Further, i is signaled in the SA using a 4-bit field.

In Step 2, if an instance of semi-persistent candidate resource X with a period of P*I collides with a next instance of resource Y, which is reserved by another UE and meets the exclusion condition in the agreed threshold test, the UE should exclude resource X. Here, I is a value signaled for i in the SA. If the number of resources remaining after Step 2 is smaller than 20% of the total resources within a selection window, the UE repeats Step 2 by increasing the PSSCH-RSRP threshold until the number of remaining resources is greater than 20% of the total resources. Each resource in this counting corresponds to required resource allocation. Other mechanisms related to congestion control can be used.

In Step 3, the measurement periodicity of PSSCH resources is P. The measurement is restricted to the resources remaining after Step 2. Step 3 can sub-divided into Step 3-0, Step 3-1, and Step 3-2. Specifically, in Step 3-0, if a counter reaches zero, the UE maintains the current resource and resets the counter with a probability of p. With a probability of 1-p, a resource is reselected by Steps 3-1 and 3-2. A carrier-specific parameter, p may be (pre)configured in the range of [0, 0.2, 0.4, 0.6, 0.8].

In Step 3-1, the UE may rank PSSCH resources remaining after measurement based on total received energy and subset selection. Here, the subset is a set of candidate resources with the lowest total received energy. The size of the subset is about 20% of the total resources within the selection window. The size of the subset is equal to the minimum possible size of the outcome of Step 2.

In Step 3-2, the UE randomly selects one resource from the subset. When a TB is transmitted in one subframe, if the UE intends to select M sub-channels in one subframe in Step 3, the resource may be M contiguous sub-channels which are not excluded in Step 2. Energy measurement at each resource may be an average of the energy measured in each constituent sub-channel Resource Selection and PSCCH/PSSCH Transmission Method Based on the aforementioned features, described is a method by which a first UE selects resources and transmits PSCCH/PSSCH according to an embodiment of the present disclosure. Specifically, according to the method, the first UE can exclude subframes used by a second UE among candidate subframes for PSSCH transmission. After excluding the subframes used by the second UE, the first UE can select a subframe for transmitting a PSCCH and then transmit the PSSCH.

The subframes used by the second UE includes subframes which are assumed to be repeatedly used by the second UE according to a reservation period of the second UE. If the reservation period of the second UE is smaller than a predetermined value, the number of the subframes assumed to be repeatedly used may increase as the reservation period of the second UE decreases. For a packet with a short period, the same resource may be excluded on the assumption that the corresponding resource is repeatedly used a predetermined number of times or more within a selection window. In this case, a resource reservation repetition number may be predetermined or signaled by a network. In the case of a UE using a short reservation period, the number of reservations may increase in proportion to a short period, P. For example, if a UE uses 20 ms of P and detects use of a resource within a sensing window, the UE may assume that the corresponding resource will be reserved at least five times with a period of 20 ms. That is, when the reservation period of the second UE is x [ms] which smaller than the predetermined value, the number of the subframes assumed to be repeatedly used may be a reciprocal of 10x. For example, when the predetermined value is 100 [ms], if the reservation period of the second UE is 20 [ms], the number of times of the repeated use may be 5. Similarly, if the reservation period of the second UE is 50 [ms], the number of times of the repeated use may be 2.

When a peer UE repeats transmission based on a resource reservation, a UE may not know how many times the peer UE repeats the transmission. Thus, when a UE using a short reservation period performs transmission, it is assumed that the UE repeats the transmission enough to compensate for the short reservation period, thereby excluding resources that can collide with each other. According to this configuration, even if a UE does not know the number of repeated transmission times, the UE can efficiently avoid resource collisions.

Figure 10:
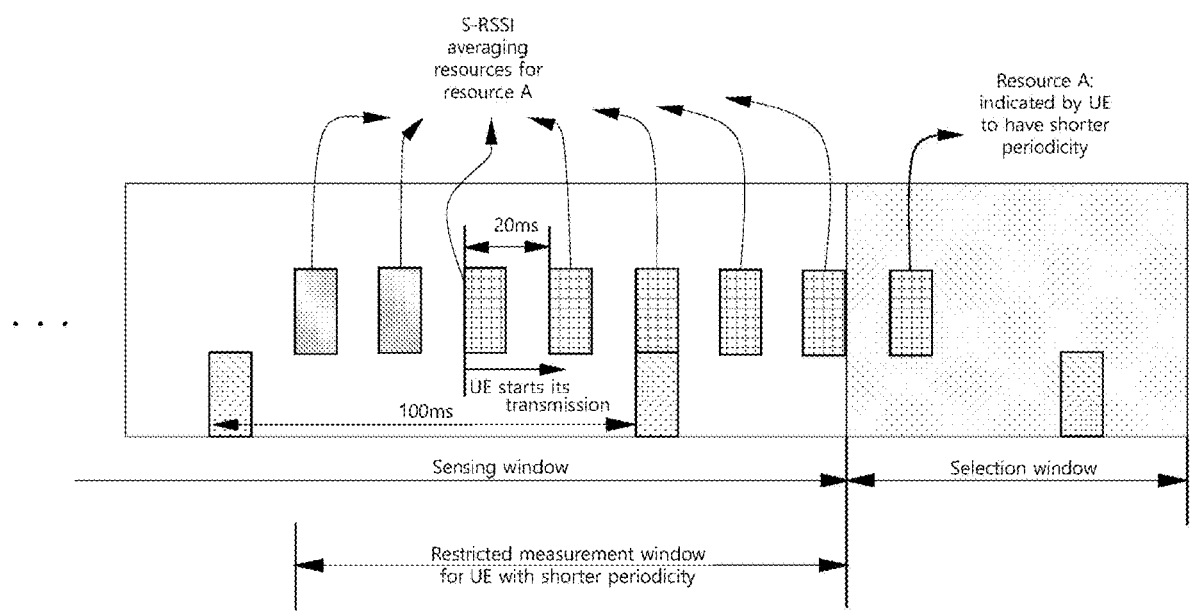
FIG. 10 illustrates a flowchart according to an embodiment of the present disclosure.

FIG. 10 illustrates such a resource selection method. Referring to FIG. 10, resource exclusion is performed as follows. First, a PSCCH of a UE that reserves resources with a period of 20 ms is decoded. Then, the resources are excluded on the assumption that when PSSCH-RSRP of a PSSCH indicated by the PSCCH is greater than a predetermined threshold, the resource exclusion is performed multiple times within a resource selection window.

When the second UE repeats transmission using a short reservation period as described above, if the first UE uses a short reservation period as does the second UE, erroneous resource selection may cause many collisions between the UEs using the short reservation periods. In addition, a UE having a reservation period of 20 ms may set a counter value related to the number of times that the UE can repeat transmission to 5, and in this case, the UE may have 50 transmission opportunities, which will be described in detail later. If two UEs select the same resource at similar times, 50 collisions may continuously occur, and this may be fatal in V2V communication. Hence, a method of measuring a Sidelink Received Signal Strength Indicator (S-RSSI) with a short period within a shortened interval may be considered only for a UE transmitting a message with a short period. In other words, when the reservation period of the first UE is less than the predetermined value, the first UE may be configured to perform measurement according to the reservation period of the first UE, which is smaller than the predetermined value. By doing so, a UE transmitting a message with a short period can accurately measure an S-RSSI of another UE transmitting a message with a different short period (in some cases, the same short period may be used), whereby the two UEs can select different resources as many as possible.

The above measurement may correspond to averaging S-RSSIs. In other words, when a UE transmitting a message with a short period measures S-RSSIs, the UE may average the S-RSSIs within the period during which the UE transmits the message. In addition, the length of an averaging window may vary in proportion to that of the short period. For example, in the case of a UE transmitting a message with a period of 20 ms, the UE may measure an S-RSSI with the period of 20 ms within a sensing window or a shortened interval (for example, 200 ms). In other words, a UE transmitting a message with a long period (above 100 ms) may measure an S-RSSI per 100 ms during one second, whereas a UE transmitting a message with a period of 20 or 40 ms may measure an S-RSSI with a period of 200 or 400 ms or per 20 or 40 ms during one second. In this case, if a counter value of the UE performing transmission with the short period is not scaled, the window size may be maintained as one second as in the other UE. According to this operation, when a UE measures an S-RSSI, the UE can effectively recognize a UE performing transmission with a different short period. In addition, even in the case of a UE performing transmission with a long period, the UE can effectively measure the strength of a signal of a UE transmitting a message with a short period because the signal of the UE with the short period can be partially included in a measurement sample.

As described above, a UE may repeat transmission based on a resource reservation after selecting resources for performing the transmission. In this case, a counter value related to the number of times that the first UE can repeat transmission may be selected within a predetermined range. In addition, the predetermined range may be configured differently for each reservation period. If the reservation period of the first UE is smaller than the predetermined value, the first UE may select the counter value within a range greater than that when the reservation period is equal to the predetermined value. That is, in the case of a UE that selects small P (reservation period), a range where the UE selects its counter value may be set different from that of a conventional V-UE. In other words, a rule may be defined such that when a UE uses small P, a range where the UE selects its counter value is set different from that of a V-UE (for example, such that the UE selects the counter value within a smaller or larger range) and/or as a multiple of 100/P.

The predetermined range may be configured such that even if the reservation period varies, a maximum value of an interval where the transmission can be repeated is constant. The interval where the transmission can be repeated is determined based on the product of the reservation period and the counter value. If the reservation period decreases, the counter value may increase so that the maximum value of the product of the reservation period and the counter value is maintained. For example, considering that in the case of 100 ms, the maximum counter value is 15, when the reservation period is 20 ms, the maximum counter value can be set to 75. In this case, when other UEs measure S-RSSIs with a period of 100 ms, if the UE using small P is allowed to use the same resources with the period of 100 ms, the measurement can be correctly performed. In addition, the reason why a counter with a larger range is used for small P is to enable another UE (in particular, a UE measuring an S-RSSI per 100 ms) to accurately measure an S-RSSI by maintaining the reservation for a long time.

Various Methods of Configuring Reservation Period Value

A UE may indicate another UE that the current frequency resource will be reused after x ms based on a reservation through a physical layer or higher layer signal. In this case, x ms can be represented as P*i. In addition, the value of P may be predetermined or indicated by a network through a physical layer or higher layer signal, and the value of i may be signaled through a control signal from a transmitting UE. In this case, the value of i, which is available in a specific resource region, may be predetermined or informed a UE by the network through a physical layer or higher layer signal. Moreover, the value of P may be configured according to the following various methods.

The value of P may be preconfigured or UE-commonly signaled by the network through a physical layer or higher layer signal. According to this method, the network determines the length of a minimum reservation period so that all UEs can perform common operations. However, if some UEs have short reservation periods in the resource region, most UEs cannot use a specific value of i. That is, when the value of i is signaled, a specific state is not indicated, and thus it may be considered as waste in terms of signaling.

To overcome the above disadvantage, even though the value of P is UE-commonly determined, a UE performing transmission with a period shorter than P may signal another UE that the UE uses a different value of P through an extra or reserved field of a control signal. The above information may be signaled to a receiving UE through part of a data region or a higher layer signal. This method has an advantage in that when most UEs make reservations with periods equal to or greater than P and very few UEs make reservations with periods smaller than P, the most UEs can use the signaled value of i.

The value of P may be determined in a resource-pool-specific manner Specifically, the minimum reservation period may be configured differently in a specific resource pool so that different operations can be performed in the corresponding resource pool. According to this operation, since different pools may be separately configured for UEs performing transmission with short periods, the value of i may not be separately signaled or be used for a different purpose. Alternatively, the value of i may be fixed to a specific state. In this case, for each resource pool, the value of P may be predetermined or signaled by the network through a physical layer or higher layer signal. To allow a receiving UE to correctly interpret a reservation period, the network may separately indicate/limit the value of P and a range of (available) i values per pool.

As another method, the value of P may be fixed (in advance), but the value of i may be scaled. Alternatively, the value of i corresponding to a decimal number may be included in a currently unused state (for example, a value such as 0.5, 0.25, 0.2, etc. may be included in state 11, 12, . . . , or 15). For instance, if i has a value from 0 to 10, it could be interpreted as one of 0.5, 1, . . . , 5 by being scaled down 0.5 times. That is, it is possible to obtain the same effect as when the value of P is changed by scaling down the value of i (less than one time) instead of explicitly changing the value of P. In this case, a scaling level is determined UE-commonly, UE-specifically (to this end, a scaling parameter may be signaled through a control signal), or pool-specifically (that is, a scaling level for each pool may be predetermined or signaled by the network).

Further, a method of interpreting P differently only for a specific packet priority may be considered. If UEs need to frequently perform transmission with short periods, PPPP is differently configured. In addition, these UEs can differently interpret P. This method has advantages in that the value of P does not need to be separately indicated and no reservation field is used. To this end, the network may signal to a UE the value of P per PPPP through a physical layer or higher layer signal. Alternatively, the value of P may be predetermined per PPPP. Similarly, a scaling level for i may be configured differently depending on PPPP. Thus, UEs can recognize the value of P or the scaling level for i per PPPP in advance and then perform sensing operations.

Operations when Short Reservation Period is Configured

When the value of P configured in a pool is less than 100 ms and the value of i is limited to 0 to 10, the maximum reservation period may decrease. To avoid this situation, when the value of i is signaled using 4 bits, unused states 11 to 15 may be used to indicate long reservation periods. For example, states 11 to 15 may indicate the values of i from 20 to 50. This configuration may vary according to the value of P. Specifically, which values are indicated by states 11 to 15 (these values may vary depending on the value of P) may be predetermined or signaled by the network through a physical layer or higher layer signal.

In addition, when small P (i.e., a short period) is introduced, S-RSSI measurement may be performed only in part of a sensing window, which is close to a selection window, with respect to the shortened period. This is because when P decreases, resource selection is not maintained for a long time even if the maximum counter value (e.g., 15) is selected. Thus, to correctly perform S-RSSI measurement, when a short reservation period is expected, S-RSSI averaging is performed on corresponding resources with the short period, and a corresponding section is limited to part of an entire sensing window, which is close to a selection window.

As another method, all UEs can measure S-RSSIs with the shortest period allowed in a corresponding resource region. In this case, for a specific resource, S-RSSIs may be measured with a period of 100 ms and a short period. Then, whether the corresponding resource is excluded or not may be determined with reference to a larger S-RSSI. Alternatively, all UEs may measure S-RSSIs with the shortest period. However, this method has a disadvantage in that S-RSSI measurement complexity of all UEs unnecessarily increases. To this end, only a UE that decodes an SA a predetermined number of times or more can perform S-RSSI measurement with a short period in a shortened sensing window with respect to a UE that transmits a message with a short period. According to this method, since a specific UE determines that a message is transmitted with a short period in the vicinity thereof and then selectively performs additional S-RSSI measurement, UE complexity may also selectively decrease.

As still another method, for a packet where resources are reserved with a short period, even if the resource reservation is performed within a sensing window, it may be assumed that next resources are used after a predetermined time rather than the value of P*i, which is indicated by a control signal. For example, for a packet with a resource reservation period of 20 ms, even if a large counter value is configured, it may be assumed that from the perspective of another transmitting UE, resources are reserved after 100 ms. By doing so, even if resource use is detected within a sensing window, it is possible to avoid the resources used for the packet with the short period by assuming that corresponding resources are used again within a selection window after elapse of a sufficient time. Such a method may be selectively performed only for a packet having a resource reservation period smaller than a predetermined threshold. For example, for a packet where resources are reserved with a period shorter than 100 ms, a rule may be defined such that the same frequency resources will be used after 100 ms regardless of a resource reservation period indicated by a control signal. For such a packet with a short period, since it is expected that a large counter will be selected, it can be assumed that corresponding resources are highly likely to be used again within a selection window.

Alternatively, when a short reservation period is allowed in a specific resource region, all UEs performing resource (re)selection in a corresponding pool may determine a selection window based on the shortest period allowed in the corresponding pool. For example, when the shortest period that can be selected in the specific resource region is 20 ms, a rule may be defined such that a UE performing the resource (re)selection in subframe n selects resources from at most n+a (where a is a value less than 4 and changeable depending on UE implementation) to only n+20. This method has an advantage in that when a short period is introduced, existing UEs can avoid resource collisions without changing their sensing operations. However, since the amount of selectable resources decrease, the possibility of selecting better resources may decrease. In the conventional operation, a UE determines the maximum upper limit time for selecting resources within its latency requirement depending on UE implementation, whereas according to this method, the maximum upper limit time is determined according to the minimum resource reservation period available in a corresponding resource region.

As a further method, a UE that reserves resources with a short period may signal to another UE information indicating how long the UE maintains corresponding resource selection during transmission through a control signal or a higher layer signal. For example, if a specific UE reserves resources 10 times, the specific UE may transmit such information by including it in a partial region of a control signal, a predetermined region, or a reserved bit. This operation may be applied selectively only to a UE performing a resource reservation with a short period or commonly applied to all UEs (regardless of resource reservation periods). Alternatively, the network may signal to a UE whether the above operation (i.e., transmitting information indicating how many times resources are reserved by including the information in a specific region of a control or data signal) is performed in a specific resource region through a physical layer or higher layer signal. If information on the number of resource reservations is included in a control signal, receiving UEs may assume that resources are reserved the corresponding number of times and then perform the following operations: sensing, resource exclusion, S-RSSI measurement, and resource selection. For example, if a UE transmitting a packet with a period of 20 ms within a sensing window receives a control signal indicating that resources are reserved up to 10 times, the UE may perform an operation of excluding resources included in a selection window among resources reserved for the corresponding UE from the resource selection (similar to the conventional operation, if measured PSCCH-RSRP is greater than a prescribed threshold, corresponding resources are excluded from selection targets). In addition, the S-RSSI measurement may also be performed only on subframes reserved according to a corresponding counter within the sensing window. In the resource exclusion operation, if resources collide with selected resources, an operation of excluding the resources from selection targets may be performed on the assumption that packets are further transmitted from a specific UE as many times as indicated by a control signal due to different periods out of the selection window.

In a selected subframe, a Physical Sidelink Control Channel (PSCCH) can be transmitted together with a PSSCH, that is, the two channels can be FDMed and transmitted. In subframes used by a second UE, a PSCCH of the second UE may be transmitted, and similarly, a PSSCH may also be transmitted through FDM. Meanwhile, the above-described operations may be performed by all UEs, or the measurement operation may be limitedly performed by a specific UE.

The above-described details can be applied not only to direct communication between UEs but also to uplink or downlink communication. In the latter case, an eNB or a relay node may use the proposed methods.

Since each of the examples of the proposed methods can be included as one method for implementing the present disclosure, it is apparent that each example can be regarded as a proposed method. In addition, although the proposed methods may be implemented independently, some of the proposed methods can be combined (or merged) with each other. Moreover, a rule may be defined such that an eNB transmits to a UE information on whether the proposed methods are applied (or information on rules related to the proposed methods) through a predefined signal (e.g., physical layer signal, higher layer signal, etc.), a transmitting UE transmits the information to a receiving UE, or a receiving UE requests a transmitting UE to transmit the information.

Device Configurations According to Embodiments of the Present Disclosure

Figure 11:
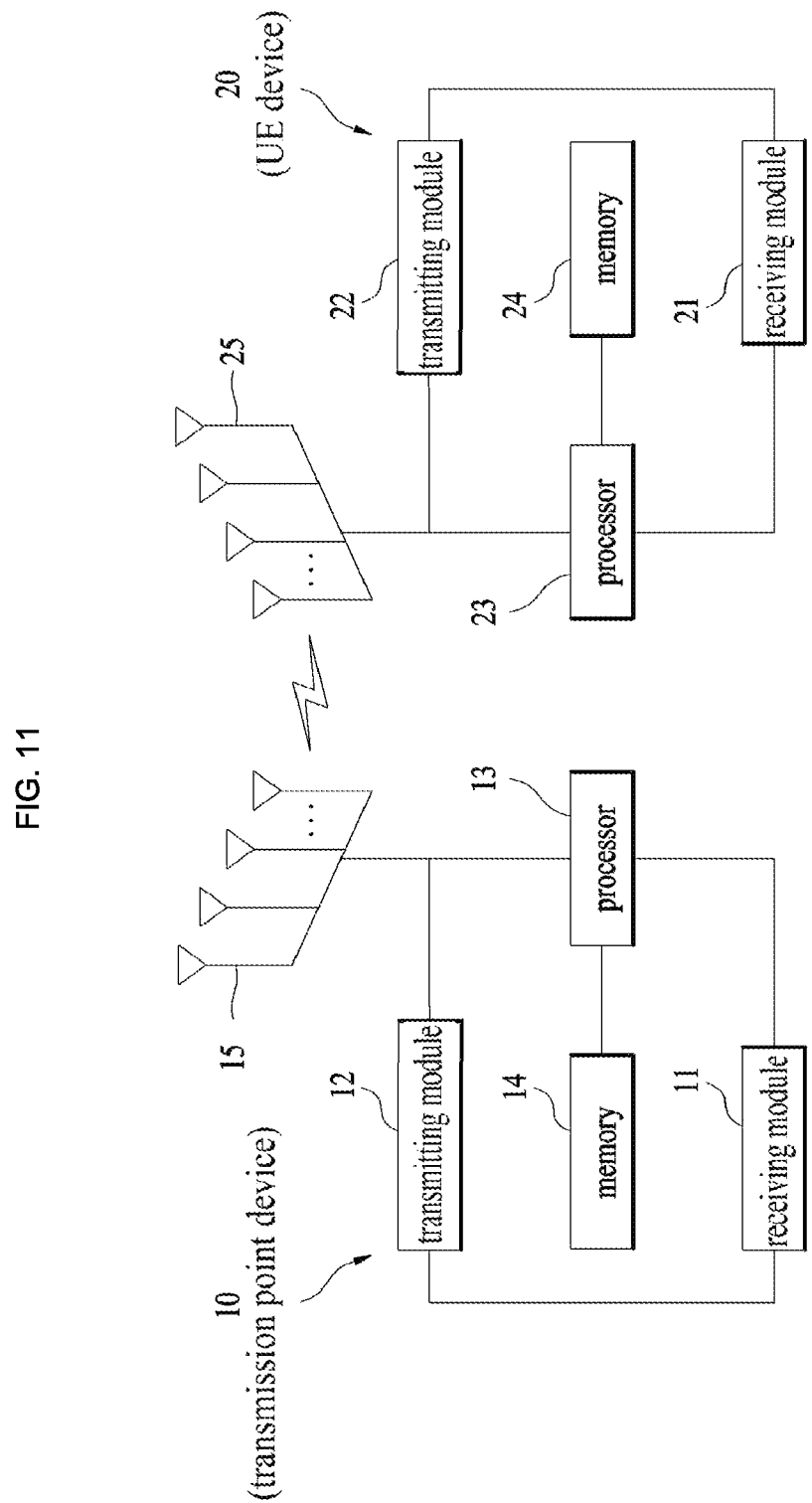
FIG. 11 is a diagram illustrating configurations of transmitting and receiving devices.

FIG. 11 is a diagram illustrating configurations of a transmission point device and a UE device according to embodiments of the present disclosure.

Referring to FIG. 11, the transmission point device 10 may include a receiving module 11, a transmitting module 12, a processor 13, a memory 14, and a plurality of antennas 15. The plurality of antennas 15 may mean that the transmission point device 10 supports MIMO transmission and reception. The receiving module 11 may receive various signals, data and information from a UE in uplink. The transmitting module 12 may transmit various signals, data and information to a UE in downlink. The processor 13 may control overall operation of the transmission point device 10.

The processor 13 of the transmission point device 10 according to an embodiment of the present disclosure may perform the operations required for the above-described embodiments.

In addition, the processor 13 of the transmission point device 10 may perform a function of processing information received by the transmission point device 10 and information to be transmitted by the transmission point device 10. The memory 14 may store the processed information during a prescribed time and be substituted with a component such as a buffer (not shown in the drawing).

Referring to FIG. 11, the UE device 20 may include a receiving module 21, a transmitting module 22, a processor 23, a memory 24, and a plurality of antennas 25. The plurality of antennas 25 may mean that the UE device supports MIMO transmission and reception. The receiving module 21 may receive various signals, data and information from an eNB in downlink. The transmitting module 22 may transmit various signals, data and information to an eNB in uplink. The processor 23 may control overall operation of the UE device 20.

The processor 23 of the UE device 20 according to an embodiment of the present disclosure may perform the operations required for the above-described embodiments. Specifically, after excluding subframes used by a second UE from among candidate subframes for PSSCH transmission, the processor may transmit a PSSCH through the transmitting module by selecting a subframe for transmitting the PSSCH. Here, the subframes used by the second UE may include subframes which are assumed to be repeatedly used by the second UE according to a reservation period of the second UE. When the reservation period of the second UE is smaller than a predetermined value, the number of the subframes assumed to be repeatedly used increases as the reservation period of the second UE decreases.

In addition, the processor 23 of the UE device 20 may perform a function of processing information received by the UE device 20 and information to be transmitted by the UE device 20. The memory 24 may store the processed information during a prescribed time and be substituted with a component such as a buffer (not shown in the drawing).

The configurations of the transmission point device and the UE device may be implemented such that the above-described embodiments can be independently applied or two or more thereof can be simultaneously applied. Here, redundant description is omitted for clarity.

The details of the transmission point device 10 described with reference to FIG. 11 may be equally applied to a relay device corresponding to a downlink transmission entity or an uplink reception entity, and the details of the UE device 20 described with reference to FIG. 11 may be equally applied to a relay device corresponding to a downlink reception entity or an uplink transmission entity.

The embodiments of the present invention may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

What is claimed is:

1. A method of transmitting a Physical Sidelink Shared Channel (PSSCH) by a first User Equipment (UE) in a wireless communication system, the method comprising:
excluding second time-domain resources from among first time-domain resources which are candidate time-domain resources for a PSSCH transmission;
selecting time-domain resources for the PSSCH in a time interval after excluding the second time-domain resources from among the first time-domain resources; and
transmitting the PSSCH on the selected time-domain resources,
wherein the second time-domain resources include third time-domain resources, the third corresponds to time-domain resources related to a plurality of repeated time-domain resources which are assumed to be used based on a reservation period and a counter,
wherein the reservation period is smaller than a predetermined value,
wherein the counter is related to the plurality of time-domain resources and a resource reselection, and
wherein a range for a selection of the counter is increased as reservation period is decreased.

2. The method of claim 1, wherein when the reservation period is 20 [ms], a number of times of the repeated use is 5.

3. The method of claim 1, wherein the predetermined value is 100 [ms].

4. A first User Equipment (UE) device for transmitting a Physical Sidelink Shared Channel (PSSCH) in a wireless communication system, the first UE device comprising:
at least one processor; and
at least one computer memory operatively coupled to the at least one processor and storing instructions which, when executed, cause the at least one processor to perform operations,
wherein the operations include excluding second time-domain resources from among first time-domain resources which are candidate time-domain resources for a PSSCH transmission;

selecting a time-domain resources for the PSSCH in a time interval after excluding the second time-domain resources from among the first time-domain resources; and transmitting the PSSCH on the selected time-domain resources, wherein the second time-domain resources include third time-domain resources, the third time-domain resources related to a plurality of time-domain resources which are assumed to be used based on a reservation period and a counter, wherein the reservation period is smaller than a predetermined value, wherein the counter is related to the plurality of time-domain resources and a resource reselection, and wherein a range for a selection of the counter is increased as reservation period is decreased.

5. The UE device according to claim 4, wherein the first UE communicates with at least one of another UE, a UE related to autonomous driving vehicle, a BS, or a network.

6. A processor for transmitting a Physical Sidelink Shared Channel (PSSCH) in a wireless communication system, the processor perform operations for a first user equipment (UE)

wherein the operations include excluding second time-domain resources from among first time-domain resources which are candidate time-domain resources for a PSSCH transmission; and selecting a time-domain resources for the PSSCH in a time interval after excluding the second time-domain resources from among the first time-domain resources; and transmitting the PSSCH on the selected time-domain resources, wherein the second time-domain resources include third time-domain resources, the third time-domain resources related to a plurality of time-domain resources which are assumed to be used based on a reservation period and a counter, wherein the reservation period is smaller than a predetermined value, wherein the counter is related to the plurality of time-domain resources and a resource reselection, and wherein a range for a selection of the counter is increased as reservation period is decreased.

7. A computer-readable storage medium storing at least one computer program including instructions which, when executed by at least one processor, cause the at least one processor to perform operations for a first user equipment (UE), wherein the operations include excluding second time-domain resources from among first time-domain resources which are candidate time-domain resources for a PSSCH transmission; and selecting a time-domain resources for the PSSCH in a time interval after excluding the second time-domain resources from among the first time-domain resources; and transmitting the PSSCH on the selected time-domain resources, wherein the second time-domain resources include third time-domain resources, the third time-domain resources related to a plurality of time-domain resources which are assumed to be used based on a reservation period and a counter, wherein the reservation period is smaller than a predetermined value, wherein the counter is related to the plurality of time-domain resources and a resource reselection, and wherein a range for a selection of the counter is increased as reservation period is decreased.

* * * * *

UNITED STATES PATENT AND TRADEMARK OFFICE
CERTIFICATE OF CORRECTION

| | |
|---|---|
| PATENT NO. | : 11,412,485 B2 |
| APPLICATION NO. | : 16/938043 |
| DATED | : August 9, 2022 |
| INVENTOR(S) | : Hyukjin Chae et al. |

It is certified that error appears in the above-identified patent and that said Letters Patent is hereby corrected as shown below:

In the Claims

Column 22, Line 41, delete "corresponds to"

Column 22, Line 42, delete "repeated"

Signed and Sealed this
Twenty-eighth Day of February, 2023

Katherine Kelly Vidal
*Director of the United States Patent and Trademark Office*